United States Patent [19]

Reed et al.

[11] Patent Number: 5,635,710

[45] Date of Patent: Jun. 3, 1997

[54] SUBSURFACE PENETROMETER RADIATON SENSOR PROBE AND SYSTEM

[75] Inventors: Bobby E. Reed; Dan Y. Eng; Bryan A. Register, all of Vicksburg; John H. Ballard, Clinton; John C. Morgan, Vicksburg, all of Miss.

[73] Assignee: The United States of America as represented by the Secretary of the Army, Washington, D.C.

[21] Appl. No.: 659,854

[22] Filed: Jun. 7, 1996

[51] Int. Cl.$^6$ ..................................................... G01V 5/00
[52] U.S. Cl. ............................................. 250/253; 250/374
[58] Field of Search .................................... 250/253, 374; 73/864.74

[56] References Cited

U.S. PATENT DOCUMENTS

| | | | |
|---|---|---|---|
| 4,804,050 | 2/1989 | Kerfoot | 73/864.74 |
| 5,128,882 | 7/1992 | Cooper et al. | 250/253 |
| 5,206,174 | 4/1993 | Gehrke et al. | 436/58 |
| 5,209,129 | 5/1993 | Jaseskis et al. | 73/864.74 |
| 5,548,115 | 8/1996 | Ballard et al. | 250/253 |

OTHER PUBLICATIONS

Register, B., "Development of a Spectral Gamma Probe to Locate & Identify Specific Radionuclides in Soil for use with the Site Characterization & Analysis Penetrometer System, Conference Paper at U.S. Army Environmental Center SCAPS", May 11, 1993.

*Primary Examiner*—Michael J. Tokar
*Assistant Examiner*—Virgil O. Tyler
*Attorney, Agent, or Firm*—Luther A. Marsh

[57] ABSTRACT

A penetrometer sensor probe and system with a detachable sleeve section which performs radiation measurements in subsurface formations. The penetrometer sensor probe measures radiation particularly gamma radiation in real time as the sensor probe is retrieved from a subsurface formation following an initial penetrometer push operation. A sacrificial sleeve surrounding the sensor probe's radiation detector is separated from the penetrometer after an initial push operation at a particular subsurface depth. During a retraction process, a sleeve section containing the radiation detector is detached from the sacrificial sleeve of the penetrometer. The sleeve provides both strength to the penetrometer and protects the probe's radiation detector from damage. Additionally, the detachable sleeve results in significantly reduced bremsstrauling scattering radiation attributed to gamma radiation that otherwise would strike a steel casing adjacent to the radiation detector. The penetrometer sensor probe and system allow for a significantly higher signal-to-noise ratio for detecting gamma radiation in subsurface media.

17 Claims, 2 Drawing Sheets

5,635,710

SUBSURFACE PENETROMETER RADIATON SENSOR PROBE AND SYSTEM

STATEMENT OF GOVERNMENT INTEREST

The invention described herein may be manufactured and used by or for the Government of the United States for governmental purposes without the payment of any royalties thereon.

FIELD OF THE INVENTION

This invention pertains to a soil penetrometer sensor probe and system for performing radiation measurements in subsurface soil/ground water formations. More particularly, the invention relates to an improved sensor probe & system for effecting radiation measurements as the detector portion of the sensor probe is retrieved from a bore hole formed by the penetrometer.

BACKGROUND OF THE INVENTION

Existing technology allows a radiation sensor probe to be delivered to subsurface locations of suspected contamination through a predrilled bore hole or by a direct push-penetrometer delivering a radiation sensor probe to a desired location.

Currently, spectral gamma sensor probes developed by the U.S. Army Engineer Waterways Experiment Station, Vicksburg, Miss. include a gamma sensor probe for spectroscopic radiation analysis of subsurface soil formations. This type of probe requires a thick steel housing around the probe's radiation sensor portion to provide strength to the gamma detector during a direct penetrometer push operation. This operation includes an initial push of the gamma sensor probe to a particular subsurface depth, stopping the sensor probe, and then collecting data over a period of time at desired subsurface locations. The data collected generally requires long acquisition periods due to the sensor probe's steel structural housing surrounding the gamma detector. Limitations of this surrounding steel housing include: i) attenuation of the radiation reaching the gamma detector and ii) increased generation of background gamma radiation by bremsstrahlung-scattering radiation resulting from gamma radiation striking atoms in the probe's steel housing which in turn causes the generation of unwanted background gamma radiation that prolongs the above mentioned data acquisition periods for determining radionuclide contaminants. The invention herein solves these problems by providing a detachable and fall-away steel sleeve adjacent to the detector that minimizes attenuation of radiation energy and radiation scattering due to a steel probe housing surrounding the probe's radiation detector.

SUMMARY OF THE INVENTION

The present invention pertains to a penetrometer sensor probe and system for performing radiation measurements in subsurface formations. In particular, the invention is an improved penetrometer sensor probe for effecting radiation measurement, and in particular gamma ray measurements in real time as the sensor probe is retrieved from the subsurface after an initial penetrometer push operation. A sacrificial sleeve surrounding the sensor probes's radiation detector is separated from the penetrometer after this initial push operation to the required subsurface depth. This sleeve provides both strength to the sensor probe and protects the probe's radiation detector from damage. During a retraction process, this sacrificial sleeve separates from the sensor probe.

Additionally, the invention's detachable sleeve results in significantly reduced bremsstrahlung scattering radiation attributed to gamma radiation that otherwise would strike a steel casing adjacent to the radiation detector as taught by prior art devices. The invention provides for a penetrometer sensor probe with a radiation detector that allows for significantly higher signal-to-noise ratio for observed gamma radiation in subsurface media formations.

OBJECTS OF THE INVENTION

Accordingly, several objects and advantages of the present invention are:

(a) To provide a spectral radiation probe, (i.e. mainly gamma detection, speciation, and concentration), configuration that is deliverable to subsurface locations via direct push-penetrometer, bore hole and wells.

(b) To provide a spectral radiation probe exhibiting significantly higher signal-to-noise ratio for low and high energy radiation.

(c) To provide a spectral radiation probe with system that minimizes the time for data acquisition. Still further advantages will become apparent from consideration of the ensuing detailed description.

DETAILED DESCRIPTION

Figure 1:
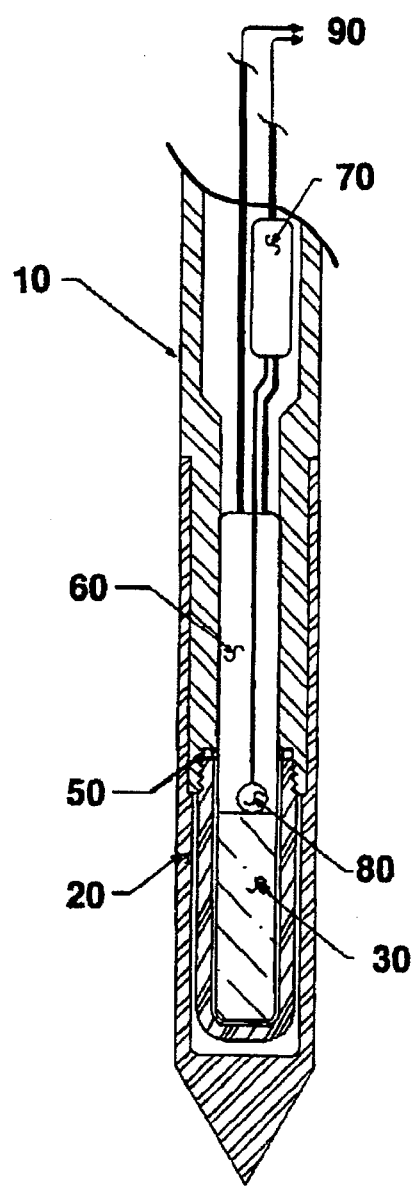
FIG. 1 show the subsurface radiation sensor probe during a push operation thereof.

FIG. 1 show the spectral radiation sensor probe 10 for identifying the type of radionuclide in subsurface formations and quantify the contaminant generating the radiation. The spectral radiation sensor probe 10 minimizes the number of down hole electronic components within the probe. The electronics present in the radiation sensor probe 10 are the i) the radiation detector 30, ii) detector interface 60 and iii) the probe electronics 70. Other electronic components for the sensor's 10 detecting capability include a power supply, signal conditioning components such as an analog-to-digital (A/D) converter, and a process controller with storage & display capabilities that is typically located in a surface data acquisition equipped vehicle. A sacrificial steel sleeve 20 surrounds the radiation detector 30 while the sensor probe 10 is being pushed into the ground so as to add strength to the sensor during the push and protect the detector 30 from damage. A protective casing 40 constructed of a material with low attenuation coefficient properties with a water-tight seal 50 is mounted under the sacrificial steel sleeve 20 and covers the subsequently exposed radiation detector 30 to prevent it from being contaminated by soil and/or ground water.

The sensor probe 10 uses a radiation detector 30 for detecting radiation in the energy range from 100 keV to 5 MeV. The probe is controlled by a process controller located at the surface via a cable to a signal processor that forms part of the process controller. The probe electronics 70 transmit values along a data transmission cable 90 to the data acquisition equipment located on the surface for analyzing, processing, storing and displaying of the detected radiation data. The detector 30 can be of various types such as scintillation crystals, solid state and modified gas proportional detectors that are readily procurable from commercial suppliers. Each of the above detector 30 types has advantages depending upon application.

Radiation spectroscopy's objective is to detect unknown radionuclide contaminants in the presence of naturally occurring radioactive materials even when the unknown radionuclides are present in small concentrations. The biggest problem associated with radiation spectroscopy in a penetrometer probe application, is the radiation detector itself. In subsurface environments, the detector must be rugged and able to operate in direct push penetrometer probe environments.

The radiation sensor probe 10 includes a radiation detector 30 and a detector interface 60, a data & power transmission cable 90, and a temperature sensor 80 for temperature compensation of the detector readings. The preferred radiation detector is a sodium-iodide crystal detector 30 which is optically coupled to the detector interface 60 which is a photo-multiplier tube (PMT).

Figure 3:
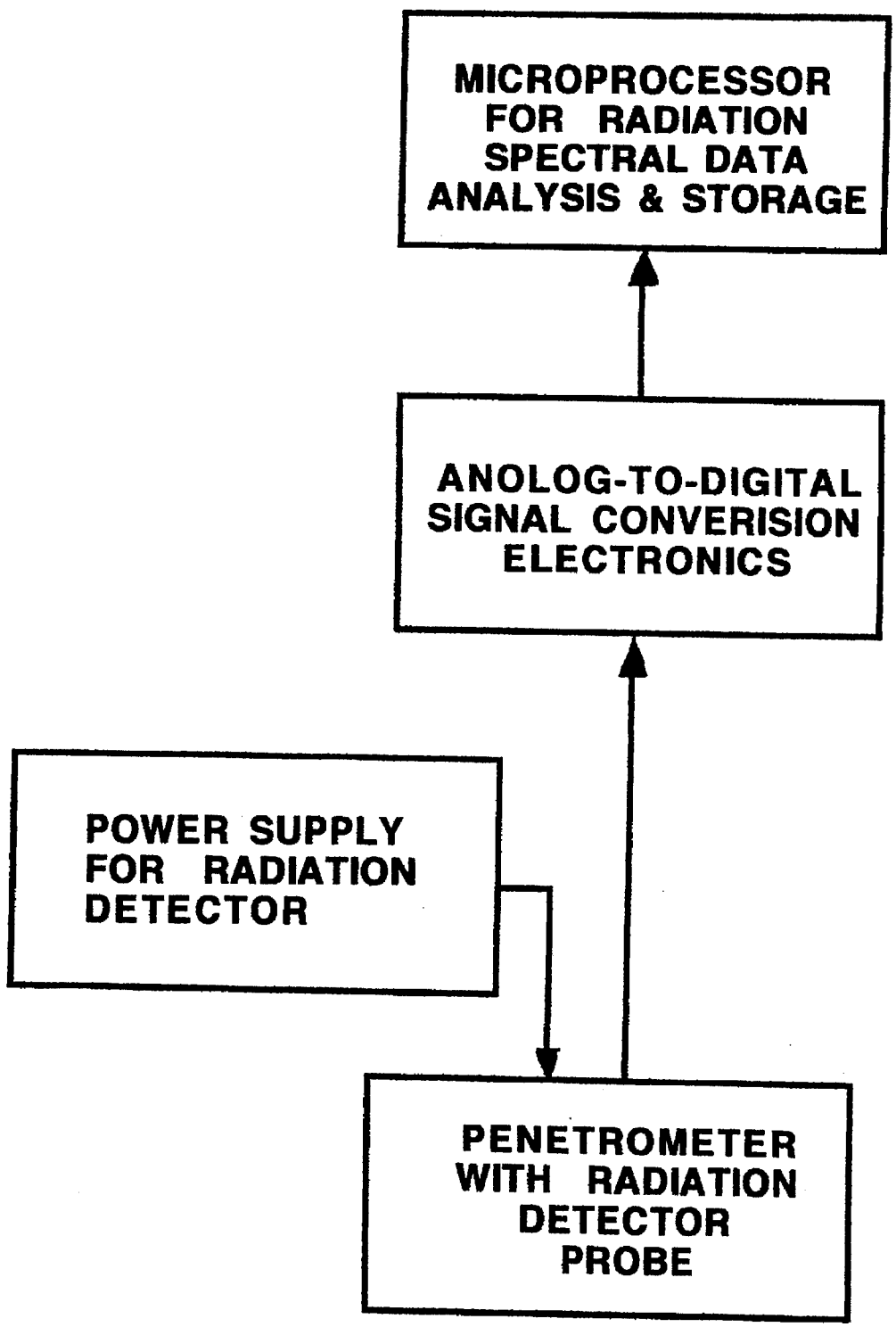
FIG. 3 show the components of the radiation detection system used with the invention's subsurface radiation sensor probe.

FIG. 3 shows ancillary system equipment which is located at the surface includes a microprocessor for analyzing the data transmissions from the probe, a voltage supply for energizing the radiation detector 30 and detector interface 60, and an A/D converter. When radiation such as a gamma ray emitted from a subsurface contaminant strikes the detector 30, the detector interface 60 produces an electrical signal that is amplified by the probe electronics 70. In the case of a sodium-iodide crystal detector 30, the gamma ray strikes the detector 30 which in turn emits a scintillation detected by the PMT 60 converting it to an electrical signal proportional to the energy of the photon. This signal is conditioned by the probe electronics 70. This signal passes from the probe electronics 70 to the surface through the transmission cable 90. The signal is further conditioned as needed using state of the art processing components. The signal is finally sent to a high speed A/D converter at the surface and is converted to digital values. From the A/D converter, the resulting digital value is passed on to the signal processor which corrects for thermal effects based on temperature sensor 80 and sorts the value within a histogram of counts versus energy for each channel. This histogram is acquired over a given period of time, then the histogram is analyzed and stored. U.S. Pat. No. 5,206,174 entitled "Method of Photon Spectral Analysis" is an example of this method and is incorporated by reference.

MODE OF OPERATION

Figure 2:
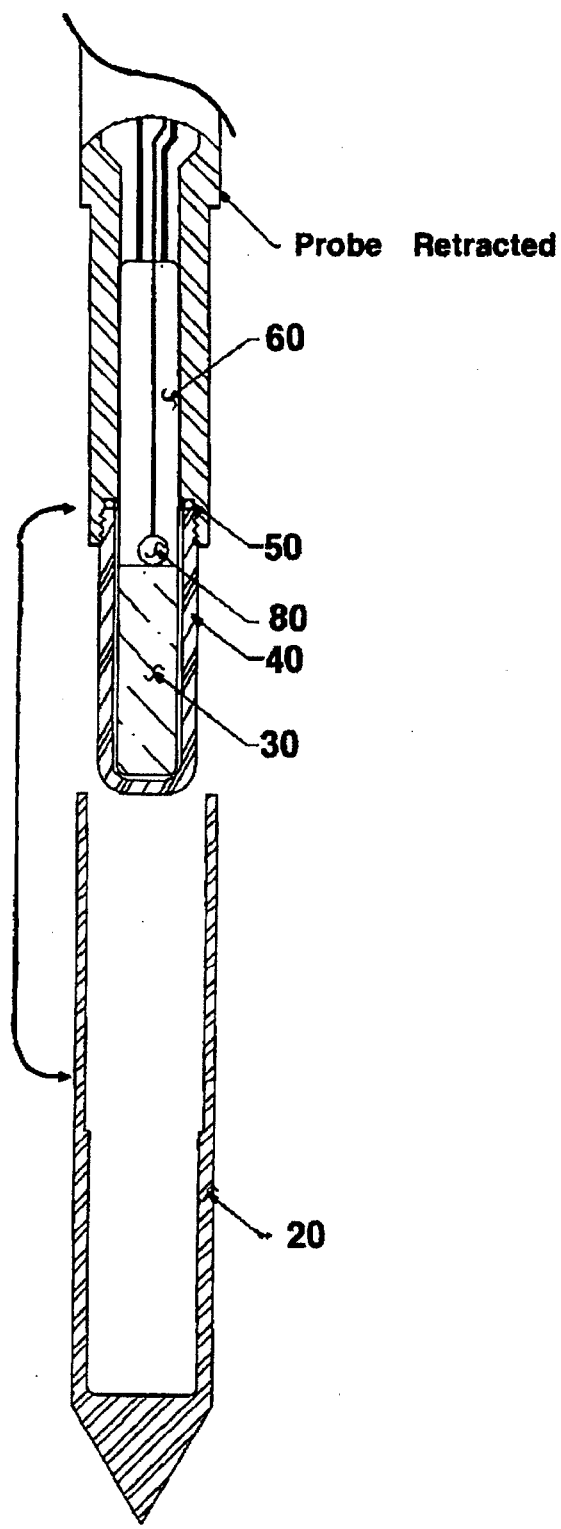
FIG. 2 show the subsurface radiation sensor probe during a retraction operation of the radiation sensor probe with sleeve separation leaving the detector portion exposed.

The U.S. Army Corps of Engineers at the Waterways Experiment Station in Vicksburg, Miss. has developed a quick, safe, cost-effective, and reliable method for radiation contaminant screening during cleanup activities. This system, the Site Characterization and Analysis Penetrometer System (SCAPS), uses a 20-ton, all-wheel drive truck to push various soil penetrometer probes equipped with sensors into the ground to detect contaminants. During the penetrometer push operation, the sacrificial steel sleeve surrounds the radiation detector, the radiation detector will be operated to collect gross counts of radiation and identify areas of high concentrations. Once the detector 30 is pushed past an area of contamination, sensor probe 10 is retracted a small distance to remove the sacrificial sleeve 20 as shown in FIG. 2. The sleeve 20 separates from the sensor probe 10 once retraction occurs since the sleeve 20 is initially held in place by friction to the sensor probe 10. The areas identified with gross gamma activity during the push can then be investigated during the retraction process with increased sensitivity, lower background and higher count levels due to the removal of the structural steel sleeve 20 that includes a penetrometer cone tip.

Although the description above contains many specificities, these should not be construed as limiting the scope of this invention as set forth in the appended claims, but as merely providing illustration of the presently preferred embodiment of this invention.

We claim:

1. A subsurface penetrometer unit including a radiation detector means for detecting radiation from surrounding subsurface media for in-situ soil/ground water contaminants including radionuclide materials, the unit comprising:

external power and data transmission leads, an inner hollow chamber and an outer soil contacting wall with a cone tip;

the inner hollow chamber is sealed and contains the radiation detector means, an electronic signal preamplifier means for i) conditioning signals from the radiation detector means and ii) detecting thermal conditions of the detector means, the preamplifier means is connected to the external power and data transmission leads;

and a separate and detachable sleeve which forms part of the outer soil contacting wall and is adapted to separate from the unit, after the unit is inserted into the soil whereby the radiation detector means is exposed to surrounding subsurface media after an initial penetrometer-push and separation operation has occurred.

2. The subsurface penetrometer of claim 1 wherein the radiation detector means is a modified gas proportional detector.

3. The subsurface penetrometer of claim 1 wherein the radiation detector means is a solid state detector.

4. The subsurface penetrometer of claim 3 wherein the solid state detector is selected from the group consisting of germanium, germanium-lithium and silicon-lithium.

5. The subsurface penetrometer of claim 1 wherein the radiation detector means is a scintillation crystal, the crystal is optically coupled to a photo-multiplier tube which in turn is electrically connected to the preamplifier means.

6. The subsurface penetrometer of claim 5 wherein the scintillation crystal is made of material selected from the group consisting of sodium-iodide, cesium-iodide, bismuth-germanate, and cesium-flouride.

7. The subsurface penetrometer of claim 1 wherein the radiation detector means detects radiation at energy levels between 100 keV to 5 MeV.

8. A method of determining radionuclide material contamination of subsurface media comprising the steps of:

(a) pushing a penetrometer probe unit with a protective outer housing to a desired subsurface depth thereby forming a cylindrical bore hole wall in the media, said unit containing a radiation detector means disposed within a sealed inner hollow chamber;

(b) exposing said radiation detector means to the surrounding subsurface media formed by step (a) by detaching a detachable sleeve section containing the radiation detector means disposed within said chamber from said protective outer housing thereby reducing background radiation resulting from bremsstrahlung-scattering radiation; and (c) retrieving the radiation detector means after step (b) and collecting radiation data from the soil formation through which the detector means passes.

9. The method of claim 8 wherein the step (b) further includes allowing the detector means to reach thermal equilibrium with the subsurface media formation.

10. The method of claim 8 wherein the step (c) further includes collecting thermal data of the detector means at thermal equilibrium for compensating for observed radiation data.

11. A system for determining radionuclide material contamination of subsurface media comprising:

a microprocessor means for storing, displaying and analyzing the spectral data transmissions from a radiation detector means for detecting the radionuclide material contamination that is disposed within a soil penetrometer unit;

a power means for energizing the radiation detector means;

a signal conditioning and analog-to-digital (A/D) converter means for converting preamplified data signals from the radiation detector means; and the soil penetrometer unit including:

external power and data transmission leads that connect the power means to the signal conditioning and A/D converter means, an inner hollow chamber and an outer soil contacting wall with a cone tip;

the inner hollow chamber is sealed and contains the radiation detector means, an electronic signal preamplifier means for i) conditioning signals detected by the radiation detector means and ii) detecting thermal conditions of the detector means, the preamplifier means is in turn connected to the external power and data transmission leads; and a separate and detachable sleeve which forms part of the outer soil contacting wall and is adapted to separate from said unit after said unit is inserted in the subsurface whereby the radiation detector means is exposed to surrounding subsurface media after an initial penetrometer-push and separation operation has occurred.

12. The system of claim 11 wherein the radiation detector means is a modified gas proportional detector.

13. The system of claim 11 wherein the radiation detector means is a solid state detector.

14. The subsurface penetrometer of claim 13 wherein the solid state detector is selected from the group consisting of germanium, germanium-lithium and silicon-lithium.

15. The system of claim 11 wherein the radiation detector means is a scintillation crystal, the crystal is optically coupled to a photo-multiplier tube which in turn is electrically connected to the preamplifier means.

16. The system of claim 15 wherein the scintillation crystal is made of material selected from the group consisting of sodium-iodide, cesium-iodide and bismuth-germanate.

17. The system of claim 11 wherein said radiation detector means detects radiation at energy levels between 100 keV to 5 MeV.

* * * * *